(12) United States Patent
Oechslen et al.

(10) Patent No.: US 12,409,721 B2
(45) Date of Patent: Sep. 9, 2025

(54) MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 431 days.

(21) Appl. No.: 18/165,945

(22) Filed: Feb. 8, 2023

(65) Prior Publication Data

US 2023/0256810 A1    Aug. 17, 2023

(30) Foreign Application Priority Data

Feb. 14, 2022   (DE) .................. 10 2022 103 357.0

(51) Int. Cl.
*H02K 9/19* (2006.01)
*B60K 11/02* (2006.01)
(Continued)

(52) U.S. Cl.
CPC ........ B60K 11/02 (2013.01); *B60K 2001/006* (2013.01); *B60Y 2200/91* (2013.01)

(58) Field of Classification Search
CPC .. B60K 11/02; B60K 11/00; B60K 2001/006; B60K 2001/003; B60Y 2200/91; H02K 9/00; H02K 9/19; H02K 9/193; H02K 9/197; H02K 9/26; H02K 7/10; H02K 7/116; F16H 57/0476; F16H 57/0467; F16H 57/04; F16H 57/0413; F16H 57/0415; F16H 57/0436; F16H 57/0417; F16H 57/042; F16H 57/0421; F16H 57/0426; F16H 57/0439; F16H 2057/02034

See application file for complete search history.

(56) References Cited

U.S. PATENT DOCUMENTS

| | | | | |
|---|---|---|---|---|
| 6,201,365 B1 * | 3/2001 | Hara | ................. | B60L 1/02 903/952 |
| 7,602,089 B2 * | 10/2009 | Kabata | ................. | H02K 9/26 310/53 |

(Continued)

FOREIGN PATENT DOCUMENTS

| | | | | |
|---|---|---|---|---|
| DE | 102016101292 A1 * | 7/2017 | ............. | H02K 5/203 |
| DE | 102016109274 A1 * | 11/2017 | ............. | H02K 9/19 |

(Continued)

*Primary Examiner* — Edgardo San Martin
(74) *Attorney, Agent, or Firm* — LEYDIG, VOIT & MAYER, LTD.

(57) ABSTRACT

A motor vehicle including a drive unit with an electric machine, wherein the electric machine is a directly cooled electric machine, a transmission, a first cooling loop for cooling assemblies of the directly cooled electric machine using a first dielectric coolant which flows directly around respective assemblies of the electric machine, a second cooling loop for cooling the transmission using a second coolant designed as a transmission oil, and a third cooling loop using a third coolant. The first cooling loop and the third cooling loop are coupled via a first heat exchanger, and the second cooling loop and the third cooling loop are coupled via a second heat exchanger.

18 Claims, 3 Drawing Sheets

(51) Int. Cl.
*F16H 57/04* (2010.01)
*H02K 7/116* (2006.01)
*H02K 9/197* (2006.01)
*B60K 1/00* (2006.01)

(56) References Cited

U.S. PATENT DOCUMENTS

| | | | |
|---|---|---|---|
| 8,631,771 B2 * | 1/2014 | Arnott | F16H 57/0417 |
| | | | 123/41.31 |
| 9,287,754 B2 * | 3/2016 | Büttner | B60L 50/51 |
| 9,752,590 B2 | 9/2017 | Rosinski | |
| 9,762,106 B2 * | 9/2017 | Gauthier | H02K 1/32 |
| 10,272,767 B1 * | 4/2019 | Tang | F01P 5/10 |
| 11,370,293 B2 * | 6/2022 | Merz | F16H 57/0436 |
| 11,577,601 B2 * | 2/2023 | Singh | B60K 11/04 |
| 11,588,379 B2 * | 2/2023 | Steinz | B60K 1/00 |
| 11,618,313 B2 * | 4/2023 | Kiehn | B60H 1/004 |
| | | | 180/68.1 |
| 11,623,508 B2 * | 4/2023 | Oechslen | H05K 7/20927 |
| | | | 310/54 |
| 11,732,795 B2 * | 8/2023 | Ishikawa | F16H 57/0424 |
| | | | 475/150 |
| 12,040,679 B2 * | 7/2024 | Nakamatsu | B60K 17/04 |
| 12,212,266 B2 * | 1/2025 | Wang | F04B 49/20 |
| 12,276,335 B2 * | 4/2025 | Gassmann | F16H 57/0476 |
| 12,278,539 B2 * | 4/2025 | Trudel | H02K 9/19 |
| 2009/0195093 A1 | 8/2009 | Bandai et al. | |
| 2021/0001714 A1 | 1/2021 | Oechslen | |
| 2021/0006132 A1 | 1/2021 | Steinz et al. | |
| 2022/0126677 A1 | 4/2022 | Assaad et al. | |
| 2022/0190685 A1 | 6/2022 | Fernandez et al. | |
| 2023/0090548 A1 * | 3/2023 | Ishikawa | H02K 5/203 |
| | | | 310/68 D |
| 2023/0139180 A1 * | 5/2023 | Ishikawa | H02K 7/116 |
| | | | 310/54 |
| 2023/0387754 A1 * | 11/2023 | Oechslen | H02K 9/26 |
| 2024/0271694 A1 * | 8/2024 | Gassmann | F16H 57/0413 |

FOREIGN PATENT DOCUMENTS

| | | | | |
|---|---|---|---|---|
| DE | 102019109313 A1 | | 10/2020 | |
| DE | 102019117637 A1 | | 1/2021 | |
| DE | 102019117893 A1 | | 1/2021 | |
| DE | 102019126914 A1 | * | 4/2021 | ........ F16H 57/0476 |
| DE | 102021110135 B3 | * | 8/2022 | ............... H02K 9/19 |
| FR | 3095092 A1 | | 10/2020 | |
| JP | 2000264076 A | | 9/2000 | |
| JP | 2014007884 A | * | 1/2014 | |

* cited by examiner

MOTOR VEHICLE

CROSS-REFERENCE TO PRIOR APPLICATION

This application claims benefit to German Patent Application No. DE 10 2022 103 357.0, filed on Feb. 14, 2022, which is hereby incorporated by reference herein.

FIELD

The invention relates to a motor vehicle.

BACKGROUND

Motor vehicles configured as electric vehicles and as hybrid vehicles are well known from practical experience. Both an electric vehicle and a hybrid vehicle have drive units comprising an electrical machine. The electric machine must be cooled during operation. Likewise, a transmission of the motor vehicle must be cooled during operation. Until now, it has been difficult to efficiently cool both the electric machine and the transmission of a motor vehicle and have a compact design.

DE 10 2019 117 893 A1 discloses a motor vehicle, the drive unit of which comprises an electric machine. The motor vehicle comprises a cooling loop, wherein the coolant flowing through the cooling loop flows through both a transmission and power electronics as well as an electric machine. The coolant serves to cool both the rotor and the stator of the electric machine. This cooling loop is coupled to a further cooling loop via a heat exchanger, which serves to cool a battery.

DE 10 2019 117 637 A1 discloses a further motor vehicle, the powertrain of which comprises an electric machine and a transmission. Two cooling loops are disclosed, wherein the first coolant of the first cooling loop flows through the transmission and the rotor of the electric machine, and the second coolant of the second cooling loop flows through the stator of the electric machine. Both cooling loops are coupled via a heat exchanger.

US 2009/0 195 093 A1 and JP 2000 264 076 A disclose further prior art.

SUMMARY

In an embodiment, the present disclosure provides a motor vehicle comprising a drive unit comprising an electric machine, wherein the electric machine is a directly cooled electric machine, a transmission, a first cooling loop for cooling assemblies of the directly cooled electric machine using a first dielectric coolant which flows directly around respective assemblies of the electric machine, a second cooling loop for cooling the transmission using a second coolant designed as a transmission oil, and a third cooling loop using a third coolant. The first cooling loop and the third cooling loop are coupled via a first heat exchanger, and the second cooling loop and the third cooling loop are coupled via a second heat exchanger.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
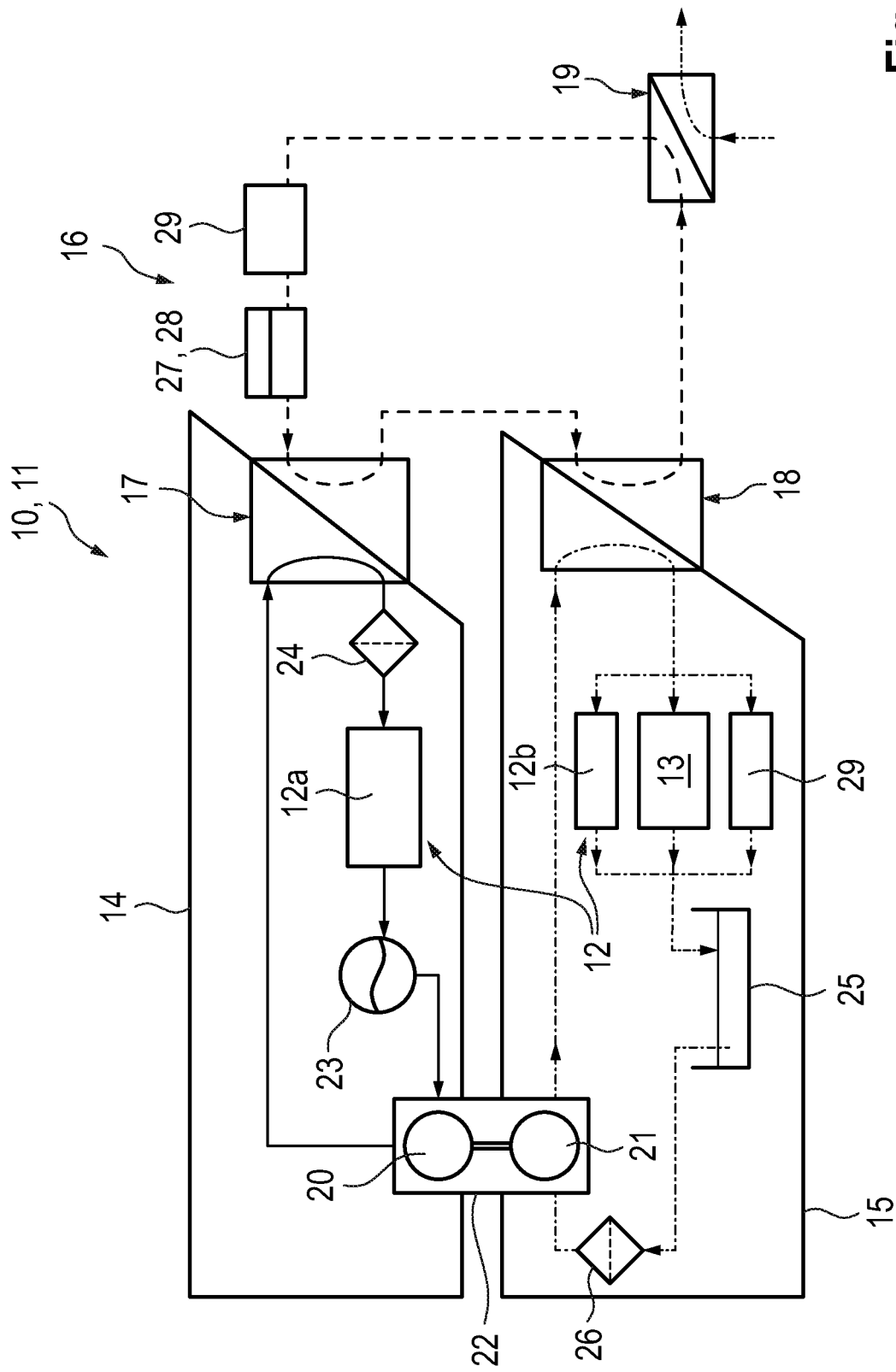
FIG. 1 shows a block diagram of a cooling system of a motor vehicle according to an embodiment the invention.

In an embodiment, the present invention provides a motor vehicle having a compact and efficient cooling system.

The motor vehicle according to an embodiment of the present invention has a drive unit comprising an electric machine, wherein the electric machine is a directly cooled electric machine. The motor vehicle according to an embodiment of the invention further comprises a transmission. The motor vehicle according to an embodiment of the invention further comprises a first cooling loop for cooling the directly cooled electric machine using a first, dielectric coolant, which flows directly around assemblies of the electric machine, and comprises a second cooling loop for cooling the transmission using a second coolant designed as a transmission oil, and comprises a third cooling loop using a third coolant, wherein the first cooling loop and the third cooling loop are coupled via a first heat exchanger, and the second cooling loop and the third cooling loop are coupled via a second heat exchanger.

The motor vehicle according to an embodiment of the invention enables efficient cooling of at least the electric machine and the transmission along with a cooling system that is compact in design. The first coolant of the first cooling loop and the second coolant of the second cooling loop are not cooled directly against the environment, but rather against the third coolant of the third cooling loop. Doing so enables the cable lengths to be reduced and heat dissipation to be made more efficient.

Preferably, the first heat exchanger and the second heat exchanger are connected in series to one another such that the third coolant first passes through the first heat exchanger and then through the second heat exchanger, or first passes through the second heat exchanger and then through the first heat exchanger. Alternatively, the first heat exchanger and the second heat exchanger are connected to one another in parallel such that a first portion of the third coolant passes through the first heat exchanger, and a second portion of the third coolant passes through the second heat exchanger.

In order to ensure a design that is as compact as possible, the two heat exchangers of the first cooling loop and the second cooling loop are preferably connected to one another in a row, i.e., in series. It is in this case preferably provided that the third coolant first flows via the first heat exchanger of the first cooling loop and then via the second heat exchanger of the second cooling loop. In this case, the electric machine and the transmission are then cooled according to their thermal criticality.

Preferably, the first cooling loop comprises a first feed pump, and the second cooling loop comprises a second feed pump, which pumps are designed as tandem pumps. The first feed pump conveys the first coolant at a first feed rate, and the second feed pump conveys the second coolant at a second feed rate. A tandem pump aids in the compact design of the cooling system.

Preferably, the first feed rate is greater, particularly at least 50% greater, than the second feed rate. Effective cooling of both the electric machine and the transmission is possible via these feed rates.

Preferably, the first cooling loop is configured such that the first coolant flows directly around at least windings of a stator of the electric machine. The second cooling loop is preferably configured such that the second coolant thereof also cools a shaft and/or windings of a rotor of the electric machine in addition to the transmission. Cooling the windings of the stator via the first cooling loop (and therefore the first coolant), and cooling the shaft and/or windings of the rotor via the second cooling loop (and therefore the second coolant) is preferred. Alternatively, however, it is also possible to cool the windings of the stator as well as the shaft and/or the windings of the rotor via the first cooling loop (and therefore the first coolant).

Preferably, the third cooling loop comprises an air-water heat exchanger and is preferably configured such that the third coolant thereof cools a pulse inverter and/or a torque vectoring machine. Doing so enables advantageous cooling of the pulse inverter, as well as an optional torque vectoring machine, and a compact design of the cooling system.

FIG. 1 is a block diagram of assemblies of an motor vehicle 10, in particular of assemblies of a cooling system 11 of the motor vehicle 10, which are used at least for cooling an electric machine 12 of a drive unit of the motor vehicle 10, as well as for cooling a transmission 13 of the motor vehicle 10.

In an exclusively electrically driven motor vehicle, the motor vehicle 10 comprises only the electric machine 12. An internal combustion engine is additionally present in a hybrid vehicle. The transmission 13 is connected on the drive side, between the drive unit and a power takeoff, wherein the transmission provides a tractive effort from the power unit to the power takeoff of the motor vehicle 10.

The motor vehicle 10 comprises a first cooling loop 14, around which a first coolant for cooling the electric machine 12 flows.

The electric machine 12 is in this case a directly cooled electric machine, wherein in order to cool the directly cooled electric machine, the first coolant, which is designed as a dielectric coolant, flows around the assemblies of said electric machine.

The motor vehicle 10 further comprises a second cooling loop 15, which serves to cool at least the transmission 13. A second coolant flows around the second cooling loop 15, wherein the second coolant is transmission oil.

The motor vehicle further comprises a third cooling loop 16. A third, in particular water-based, coolant flows around the third cooling loop 16.

The third cooling loop 16 is coupled to the first cooling loop 14 via a first heat exchanger 17. In addition, the third cooling loop 16 is coupled to the second cooling loop 15 via a second heat exchanger 18.

Therefore, the first coolant of the first cooling loop 14 and the second coolant of the second cooling loop 15 are recooled via the third coolant of the third cooling loop 16 via the two heat exchangers 17, 18.

In FIG. 1, the two heat exchangers, i.e., the first heat exchanger 17 of the first cooling loop 14 and the second heat exchanger 18 of the second cooling loop 15, are connected to one another in series, i.e., such that the third coolant flowing through the third cooling loop 16 first flows through the first heat exchanger 17 and then through the second heat exchanger 18.

Figure 2:
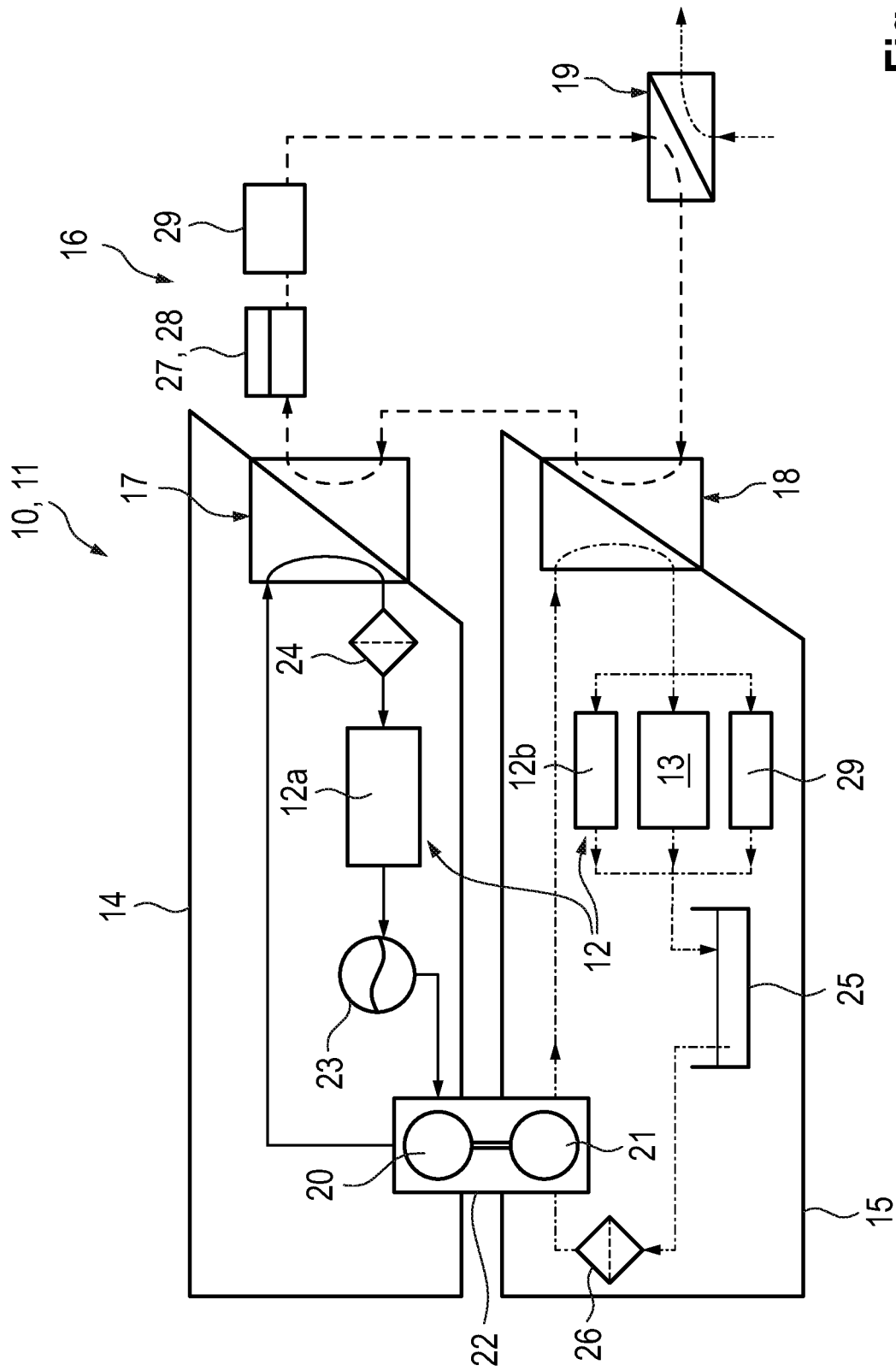
FIG. 2 shows a block diagram of a cooling system of a motor vehicle according to an embodiment the invention.

According to FIG. 2, the direction of flow of the third coolant through the third cooling loop 16 can also be reversed, wherein in FIG. 2 the third coolant of the third cooling loop 16 first flows through the second heat exchanger 18 of the second cooling loop 15 and only then flows through the first heat exchanger 17 of the first cooling loop 14 (i.e., when viewed in the direction of flow of the third coolant 16, based on an air-water heat exchanger 19 of the third cooling loop 16).

The third, in particular water-based, coolant of the third cooling loop 16 as well as air flows around the air-water heat exchanger 19 in order to cool the third coolant of the third cooling loop 16 via the ambient air.

Figure 3:
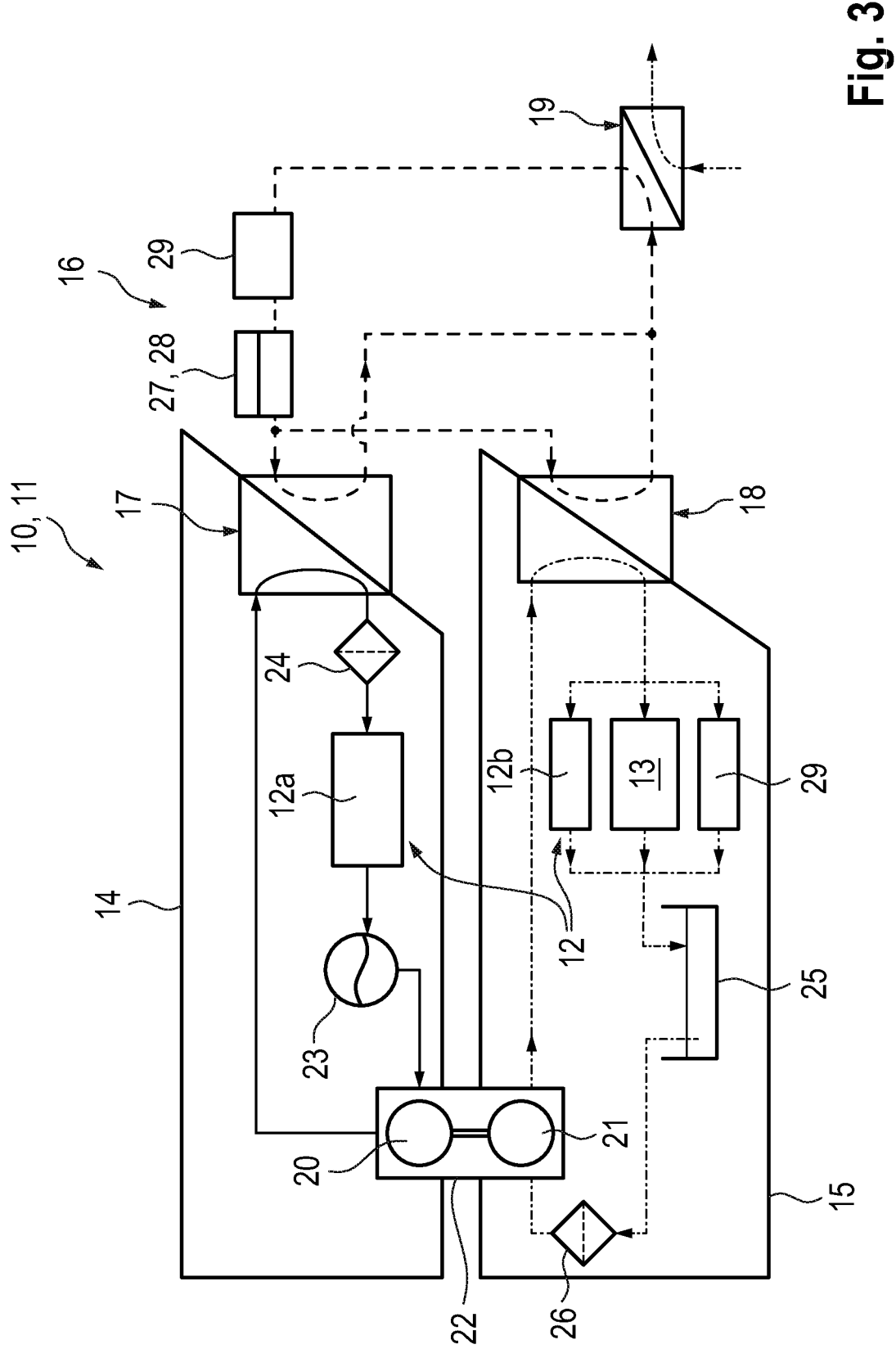
FIG. 3 shows a block diagram of a cooling system of a motor vehicle according to the invention.

In FIG. 3, the first heat exchanger 15 of the first cooling loop 14 and the second heat exchanger 18 of the second cooling loop 15 are connected to one another in parallel such that a first portion of the third coolant of the third cooling loop 16 then flows through the first heat exchanger 17, and a second portion of the third coolant of the third cooling loop 16 flows through the second heat exchanger 18. The heat exchangers 17, 18 are preferably plate heat exchangers.

The first cooling loop 14 comprises a first feed pump 20, and the second cooling loop 15 comprises a second feed pump 21. The two feed pumps 20, 21 of the two cooling loops 14, 15 are preferably designed as tandem pumps 22.

The first feed pump 20 of the first cooling loop 14 conveys the first coolant at a first feed rate. The second feed pump 21 of the second cooling loop 15 conveys the second coolant at a second feed rate.

The first conveyance rate is in this case preferably greater than the second conveyance rate, in particular at least 50% greater.

The first cooling loop 14, which serves to cool the electric machine 12, is in this case configured such that the first, dielectric coolant flows directly around at least windings of a stator 12a of the electric machine 12.

The first coolant of the first cooling loop 14 then flows into a coolant reservoir 23 of the first cooling loop 14. In order to cool and filter the first coolant of the first cooling loop 14 immediately upstream of the electric machine 12, a filter 24 is connected between the first heat exchanger 17, via which the first cooling loop 14 and the third cooling loop 16 are coupled, and the stator 12a of the electric machine 12.

The filter 24 can be a fine filter, e.g., a molecular filter or a molecular sieve. The filter 24 ensures that no contaminants able to cause short circuits will enter the electric machine 12.

In the embodiment shown, the second cooling loop 15 serves not only to cool the transmission 13, but also to cool a shaft as well as windings of a rotor 12b of the electric machine 12. When viewed in the direction of flow of the second coolant of the second cooling loop 15, the rotor 12b of the electric machine 12 is in this case connected to the transmission 13 in parallel.

After flowing through the transmission 13 and the rotor 12b of the electric machine 12, the second coolant, which is designed as a transmission oil, enters an oil sump 25, wherein in FIG. 1 a filter 26 is connected between the oil sump 25 and the second feed pump 21, preferably immediately upstream of the feed pump 21.

In contrast to the preferential embodiment shown, it is also possible to directly cool both the rotor 12b and the stator 12a via the first coolant of the first cooling loop 14.

FIG. 1 illustrates a pulse inverter 27 of a power electronics means 28 as a further assembly of the motor vehicle, wherein the pulse inverter 27 of the power electronics means 28 is cooled by the third coolant of the third cooling loop 16.

If the motor vehicle comprises a torque vectoring machine 29, then said machine can be cooled either via the third cooling loop 16 or via the second cooling loop 15, as shown in FIG. 1. If the torque vectoring machine 29 is cooled via the third cooling loop 16, then said machine is preferably connected to the pulse inverter 27 in series. If the torque vectoring machine 29 is cooled via the second cooling loop 15, then said machine is preferably connected to the transmission 13 in parallel.

As previously stated, the second coolant in the second cooling loop 15 is used as a transmission oil.

The first coolant of the first cooling loop 14 is a dielectric coolant, i.e., a dielectric oil.

The third coolant of the third cooling loop 16 is in particular a water-based coolant, preferably a water-glycol mixture. A refrigerant or CO2 may also be used as the third coolant of the third cooling loop 16.

Preferably, the motor vehicle 10 is exclusively an electrically driven motor vehicle.

Embodiments of the invention enable efficient cooling of both the electric machine 12 and the transmission 13, as well as the pulse inverter 27 and an optional torque vectoring machine 29 along with a compact design of the cooling system. The coolant used for cooling the electric machine and the coolant used for cooling the transmission are not cooled directly against the local environment, but rather against the third coolant of the third cooling loop. The direction of flow within the third cooling loop 16 is in particular matched to the thermal criticality of the components to be cooled. At least the windings of stator 12a of electric machine 12 are directly cooled.

Preferably, the two feed pumps 20, 21 of first cooling loop 14 and second cooling loop 15 are designed as tandem pumps.

The third cooling loop 16 preferably also comprises a feed pump.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle comprising:
   a drive unit comprising an electric machine, wherein the electric machine is a directly cooled electric machine;
   a transmission;
   a first cooling loop for cooling assemblies of the directly cooled electric machine using a first dielectric coolant which flows directly around respective assemblies of the electric machine;
   a second cooling loop for cooling the transmission using a second coolant designed as a transmission oil; and
   a third cooling loop using a third coolant,
   wherein the first cooling loop and the third cooling loop are coupled via a first heat exchanger, and the second cooling loop and the third cooling loop are coupled via a second heat exchanger.

2. The motor vehicle according to claim 1, wherein the first heat exchanger and the second heat exchanger are connected to one another in series such that the third coolant first flows through the first heat exchanger and then through the second heat exchanger, or first flows through the second heat exchanger and then through the first heat exchanger.

3. The motor vehicle according to claim 1, wherein the first heat exchanger and the second heat exchanger are connected to one another in parallel such that a first portion of the third coolant flows through the first heat exchanger, and a second portion of the third coolant flows through the second heat exchanger.

4. The motor vehicle according to claim 1, wherein the first cooling loop comprises a first feed pump, and the second cooling loop comprises a second feed pump, the first and second feed pumps being designed as tandem pumps.

5. The motor vehicle according to claim 4, wherein the first feed pump conveys the first coolant at a first feed rate, and the second feed pump conveys the second coolant at a second feed rate, wherein the first feed rate is greater than the second feed rate.

6. The motor vehicle according to claim 1, wherein the first cooling loop is configured such that the first coolant flows directly around and cools at least windings of a stator of the electric machine.

7. The motor vehicle according to claim 1, wherein the first cooling loop is configured such that the first coolant also flows directly around and cools a shaft and/or windings of a rotor of the electric machine.

8. The motor vehicle according to claim 1, wherein the second cooling loop is configured such that the second coolant cools a shaft and/or windings of a rotor of the electric machine.

9. The motor vehicle according to claim 1, wherein the second cooling loop is configured, and/or the third cooling loop is configured, such that the second coolant and/or the third coolant cools a torque vectoring machine.

10. The motor vehicle according to claim 1, wherein the third cooling loop comprises an air-water heat exchanger.

11. The motor vehicle according to claim 1, wherein the first cooling loop comprises a filter connected, in a direction of flow of the first coolant, between the first heat exchanger and the electric machine.

12. The motor vehicle according to claim 1, wherein the first cooling loop comprises a coolant reservoir connected, in a direction of flow of the first coolant, between the electric machine and the first feed pump.

13. The motor vehicle according to claim 1, wherein the second cooling loop comprises an oil sump and a filter, wherein the filter is connected, in a direction of flow of the second coolant, between the oil sump and the second feed pump.

14. The motor vehicle according to claim 1, wherein the third coolant is a water-based coolant, or a refrigerant, or CO2.

15. The motor vehicle according to claim 1, wherein the motor vehicle is exclusively an electrically driven electric vehicle.

16. The motor vehicle according to claim 5, wherein the first feed rate is 50% greater than the second feed rate.

17. The motor vehicle according to claim 10, wherein the third coolant cools a pulse inverter.

18. The motor vehicle according to claim 14, wherein the third coolant is a water-glycol mixture.

\* \* \* \* \*